(12) United States Patent
Miyaishi et al.

(10) Patent No.: US 11,667,574 B2
(45) Date of Patent: Jun. 6, 2023

(54) PRECURSOR OF ALUMINA SINTERED BODY, METHOD FOR PRODUCING ALUMINA SINTERED BODY, METHOD FOR PRODUCING ABRASIVE GRAINS, AND ALUMINA SINTERED BODY

(71) Applicant: SHOWA DENKO K.K., Tokyo (JP)

(72) Inventors: So Miyaishi, Kawasaki (JP); Satoshi Iinou, Matsumoto (JP)

(73) Assignee: SHOWA DENKO K.K., Tokyo (JP)

( * ) Notice: Subject to any disclaimer, the term of this patent is extended or adjusted under 35 U.S.C. 154(b) by 371 days.

(21) Appl. No.: 16/768,231

(22) PCT Filed: Dec. 25, 2018

(86) PCT No.: PCT/JP2018/047595
§ 371 (c)(1),
(2) Date: May 29, 2020

(87) PCT Pub. No.: WO2019/131644
PCT Pub. Date: Jul. 4, 2019

(65) Prior Publication Data
US 2020/0308056 A1    Oct. 1, 2020

(30) Foreign Application Priority Data

Dec. 27, 2017   (JP) .............................. JP2017-251271

(51) Int. Cl.
*C04B 35/10*     (2006.01)
*C09K 3/14*      (2006.01)

(52) U.S. Cl.
CPC ............ *C04B 35/10* (2013.01); *C09K 3/1418* (2013.01); *C04B 2235/3225* (2013.01); *C04B 2235/404* (2013.01); *C04B 2235/405* (2013.01); *C04B 2235/407* (2013.01); *C04B 2235/408* (2013.01)

(58) Field of Classification Search
CPC ............ C04B 35/10; C04B 2235/3225; C04B 2235/404; C04B 2235/405; C04B 2235/407; C04B 2235/408; C04B 2235/3201; C04B 2235/3206; C04B 2235/3208; C04B 2235/3251; C04B 2235/3258
See application file for complete search history.

(56) References Cited

U.S. PATENT DOCUMENTS

| | | |
|---|---|---|
| 4,719,188 A | 1/1988 | Koba et al. |
| 4,770,671 A | 9/1988 | Monroe et al. |
| 5,383,945 A | 1/1995 | Cottringer et al. |
| 5,527,369 A * | 6/1996 | Garg .................... C09K 3/1418 51/307 |
| 5,531,799 A | 7/1996 | Wagner et al. |
| 5,639,704 A | 6/1997 | Inuzuka et al. |
| 5,690,707 A * | 11/1997 | Wood .................... C09K 3/1409 51/293 |
| 5,893,935 A * | 4/1999 | Wood .................. C04B 35/1115 51/293 |
| 5,928,979 A | 7/1999 | Inuzuka et al. |
| 2004/0151925 A1 | 8/2004 | Inoue et al. |
| 2018/0244578 A1 | 8/2018 | Nishio et al. |

FOREIGN PATENT DOCUMENTS

| | | |
|---|---|---|
| CA | 2018584 A1 | 12/1990 |
| CN | 1389427 A | 1/2003 |
| CN | 1524826 A | 9/2004 |
| CN | 1533999 A | 10/2004 |
| CN | 101148352 A | 3/2008 |
| CN | 107285746 A | 10/2017 |
| CN | 108025980 A | 5/2018 |
| EP | 0 402 686 A1 | 12/1990 |
| JP | 60-231462 A | 11/1985 |
| JP | 62-190279 A | 8/1987 |
| JP | 04-020586 A | 1/1992 |
| JP | 10-504348 A | 4/1998 |
| JP | 10-130049 A | 5/1998 |

(Continued)

OTHER PUBLICATIONS

Egger et al. Sol-gel synthesis of polymer-YSZ hybrid materials for SOFC technology. Journal of the European Ceramic Society vol. 24, Issue 6, 2004, pp. 1371-1374.*
Office Action dated Nov. 23, 2021 from the China National Intellectual Property Administration in CN Application No. 201880074716.2.
Kenji Ito et al., "Properties of Yttria-Added Alumina Ceramics", Reports of Seto Ceramic Research Institute, 1999, pp. 22-24, No. 28, Aichi Prefectural Government.
Shuichi Yasuda et al., "Improvement of High-temperature Creep Resistance in Polycrystalline $Al_2O_3$ by Cations Co-doping", Materials Transactions, 2004, pp. 2078-2082, vol. 45, No. 7.

(Continued)

*Primary Examiner* — Noah S Wiese
(74) *Attorney, Agent, or Firm* — Sughrue Mion, PLLC

(57) ABSTRACT

A precursor of an alumina sintered compact including aluminum, yttrium, and at least one metal selected from iron, zinc, cobalt, manganese, copper, niobium, antimony, tungsten, silver, and gallium. The aluminum content is 98.0% by mass or more as an oxide ($Al_2O_3$) in 100% by mass of the precursor of an alumina sintered compact; the yttrium content is 0.01 to 1.35 parts by mass as an oxide ($Y_2O_3$) based on 100 parts by mass of the content of the aluminum as an oxide; the total content of the metals selected from the foregoing group is 0.02 to 1.55 parts by mass as an oxide based on 100 parts by mass of the content of aluminum as an oxide; and the aluminum is contained as α-alumina. Also disclosed is an alumina sintered compact, and a method for producing an alumina sintered compact and for producing abrasive grains.

9 Claims, No Drawings

(56) References Cited

FOREIGN PATENT DOCUMENTS

JP        2003-277132 A     10/2003
JP        2006-151775 A      6/2006

OTHER PUBLICATIONS

International Search Report for PCT/JP2018/047595, dated Mar. 5, 2019.
Extended European Search Report dated Aug. 17, 2021 in corresponding European Application No. 18896983.6.
Wu et al., "Effect of $Y_2O_3$ additives on the wet abrasion resistance of an alumina-based grinding medium", Wear, 2016, vol. 356-357, pp. 9-16 (8 pages total).

* cited by examiner

PRECURSOR OF ALUMINA SINTERED BODY, METHOD FOR PRODUCING ALUMINA SINTERED BODY, METHOD FOR PRODUCING ABRASIVE GRAINS, AND ALUMINA SINTERED BODY

CROSS REFERENCE TO RELATED APPLICATIONS

This application is a National Stage of International Application No. PCT/JP2018/047595 filed Dec. 25, 2018, claiming priority based on Japanese Patent Application No. 2017-251271 filed Dec. 27, 2017.

TECHNICAL FIELD

The present invention relates to a precursor of an alumina sintered compact, a method for producing an alumina sintered compact, a method for producing abrasive grains, and an alumina sintered compact.

BACKGROUND ART

Alumina sintered compacts are being used in a variety of industrial fields by taking advantage of their excellent characteristics of high hardness, high strength, high heat resistance, high abrasion resistance, high chemical resistance, and the like. In particular, alumina sintered compacts are used as abrasion grains that are a raw material of heavy grinding grindstones in the steel industry.

Recently, heavy grinding grindstones having a larger "grinding ratio" than those which are conventional have been required in the market. Here, the "grinding ratio" is an index expressing a performance of the grindstone and is expressed according to the following formula (A). It may be said that the larger the grinding ratio, the better the performance of grindstone is.

Grinding ratio=(Ground amount of material to be ground (grinding amount))/(Abrasion amount of grindstone)    (A)

In general, if it would be possible to grind a lot of materials to be ground with a small amount of a grindstone, the performance is judged to be good; however, the grinding ratio of the grindstone is affected by "hardness" and "fracture toughness" of abrasive grains to be used for the grindstone. It may be considered that there are the following relations between the "grinding ratio and hardness" and the "grinding ratio and fracture toughness".

(1) When the hardness of abrasive grains is high, the grinding amount increases, and therefore, the grinding ratio becomes large.

(2) When the fracture toughness is high, the abrasion amount of abrasive grains becomes small, and therefore, the grinding ratio becomes large.

Taking into consideration the aforementioned relations (1) and (2), the numerator portion in the formula of the grinding ratio is affected by the grinding amount, and the denominator portion is affected by the abrasion amount. In order to improve the grinding ratio of the grindstone, it is ideal that both the hardness and the fracture toughness are high.

Now, as the conventional abrasive grains for heavy grinding grindstone, abrasive grains resulting from sintering of an alumina raw material, and the like are known. In particular, in NPLs 1 and 2, there are made studies regarding improvements in hardness, strength, toughness, and so on of alumina sintered compacts.

For example, NPL 1 describes that when yttria is added to an alumina raw material, the grain growth is inhibited, and the mechanical characteristics of the resulting alumina sintered compact, such as bending strength, hardness, and fracture toughness value, may be improved.

In addition, NPL 2 describes that when yttria is added to an alumina raw material, in the resulting alumina sintered compact, yttrium is segregated in the alumina boundary, and a creep can be inhibited.

However, in the case of the aforementioned alumina sintered compact having yttria added thereto, sintering owing to the addition of yttria is hindered, and it is difficult to obtain a minute sintered compact. Thus, in order to obtain a minute sintered compact, a heat treatment at a high temperature was needed. For that reason, in production of such an alumina sintered compact, there was involved such a problem that the production costs increase.

CITATION LIST

Non-Patent Literature

NPL 1: Reports of Seto Ceramic Research Institute, Aichi Prefectural Government, No. 28, pages 22 to 24, "Characteristics of Yttria-Added Alumina Ceramics"

NPL 2: Materials Transactions, Vol. 45, No. 7 (2004), pages 2078 to 2082

SUMMARY OF INVENTION

Technical Problem

Then, an object of the present invention is to provide a precursor of an alumina sintered compact which is readily sintered at a lower temperature as compared with a conventional alumina raw material mixture containing yttrium and is able to provide an alumina sintered compact that is minute and excellent in mechanical characteristics; and a method for producing an alumina sintered compact using the precursor.

Solution to Problem

The present inventors made extensive and intensive investigations. As a result, it has been found that when a precursor of an alumina sintered compact contains aluminum, yttrium, and at least one metal selected from the group consisting of iron, zinc, cobalt, manganese, copper, niobium, antimony, tungsten, silver, and gallium in a predetermined quantitative relation, and the alumina is contained as α-alumina, not only an alumina sintered compact with excellent mechanical characteristics is obtained, but also the precursor is readily sintered at a lower temperature, thereby leading to accomplishment of the present invention.

Specifically, the gist and configuration of the present invention are as follows.

[1] A precursor of an alumina sintered compact including aluminum, yttrium, and at least one metal selected from the group consisting of iron, zinc, cobalt, manganese, copper, niobium, antimony, tungsten, silver, and gallium, wherein the content of the aluminum is 98.0% by mass or more as expressed in terms of an oxide ($Al_2O_3$) in 100% by mass of the precursor of an alumina sintered compact;

the content of the yttrium is 0.01 to 1.35 parts by mass as expressed in terms of an oxide ($Y_2O_3$) based on 100 parts by mass of the content of the aluminum as expressed in terms of an oxide;

the total content of the metals selected from the foregoing group is 0.02 to 1.55 parts by mass as expressed in terms of an oxide based on 100 parts by mass of the content of aluminum as expressed in terms of an oxide; and the aluminum is contained as α-alumina.

[2] The precursor of an alumina sintered compact as set forth in the above [1], wherein the yttrium is contained as yttrium acetate tetrahydrate.

[3] The precursor of an alumina sintered compact as set forth in the above [1] or [2], which is used for obtaining an alumina sintered compact constituting abrasive grains.

[4] A method for producing an alumina sintered compact, including:

a step (I) of obtaining the precursor of an alumina sintered compact as set forth in any one of the above [1] to [3]; and a step (II) of firing the precursor of an alumina sintered compact, to obtain an alumina sintered compact.

[5] The method for producing an alumina sintered compact as set forth in the above [4], wherein the step (I) of obtaining the precursor of an alumina sintered compact includes a step of mixing α-alumina, a compound containing yttrium, and a compound containing at least one metal selected from the group consisting of iron, zinc, cobalt, manganese, copper, niobium, antimony, tungsten, silver, and gallium.

[6] The method for producing an alumina sintered compact as set forth in the above [4] or [5], wherein the compound containing yttrium is yttrium acetate tetrahydrate.

[7] The method for producing an alumina sintered compact as set forth in any one of the above [4] to [6], wherein a firing temperature of the precursor of an alumina sintered compact is 1,300 to 1,575° C.

[8] The method for producing an alumina sintered compact as set forth in any one of the above [4] to [7], wherein a relative density of the alumina sintered compact is 95.0% or more.

[9] A method for producing abrasive grains, which is performed by the method for producing an alumina sintered compact as set forth in any one of the above [4] to [8].

[10] An alumina sintered compact including aluminum, yttrium, and at least one metal selected from the group consisting of iron, zinc, cobalt, manganese, copper, niobium, antimony, tungsten, silver, and gallium, wherein the content of the aluminum is 98.0% by mass or more as expressed in terms of an oxide ($Al_2O_3$) in 100% by mass of the alumina sintered compact;

the content of the yttrium is 0.01 to 1.35 parts by mass as expressed in terms of an oxide ($Y_2O_3$) based on 100 parts by mass of the content of the aluminum as expressed in terms of an oxide;

the total content of the metals selected from the foregoing group is 0.02 to 1.55 parts by mass as expressed in terms of an oxide based on 100 parts by mass of the content of aluminum as expressed in terms of an oxide; and a relative density of the alumina sintered compact is 95.0% or more.

Advantageous Effects of Invention

In accordance with the present invention, it is possible to provide a precursor of an alumina sintered compact which is readily sintered at a lower temperature as compared with a conventional alumina raw material mixture containing yttrium and is able to provide an alumina sintered compact that is minute and excellent in mechanical characteristics; and a method for producing an alumina sintered compact using the precursor.

DESCRIPTION OF EMBODIMENTS

Embodiments of the precursor of an alumina sintered compact, the method for producing an alumina sintered compact using the precursor, the method for producing abrasive grains, and the alumina sintered compact according to the present invention are hereunder described in detail, but it should be construed that the present invention is not limited to the following embodiments.

<Precursor of Alumina Sintered Compact>

The precursor of an alumina sintered compact of the present embodiment includes aluminum, yttrium, and at least one metal selected from the group consisting of iron, zinc, cobalt, manganese, copper, niobium, antimony, tungsten, silver, and gallium, wherein the content of the aluminum is 98.0% by mass or more as expressed in terms of an oxide ($Al_2O_3$) in 100% by mass of the precursor of an alumina sintered compact; the content of the yttrium is 0.01 to 1.35 parts by mass as expressed in terms of an oxide ($Y_2O_3$) based on 100 parts by mass of the content of the aluminum as expressed in terms of an oxide; the total content of the metals selected from the foregoing group is 0.02 to 1.55 parts by mass as expressed in terms of an oxide based on 100 parts by mass of the content of aluminum as expressed in terms of an oxide; and the aluminum is contained as α-alumina.

The precursor of an alumina sintered compact of the present invention is readily sintered at a lower temperature as compared with a conventional alumina raw material mixture containing yttrium and is able to provide an alumina sintered compact that is minute and excellent in mechanical characteristics. Such a precursor of an alumina sintered compact of the present invention is suitable especially for obtaining an alumina sintered compact with high hardness and excellent fracture toughness.

Here, the precursor of an alumina sintered compact (hereinafter sometimes referred to simply as "precursor") indicates a raw material mixture before the heat treatment. In addition, the alumina sintered compact (hereinafter sometimes referred to simply as "sintered compact") indicates a sintered compact resulting from the heat treatment of the precursor.

The precursor of the present embodiment contains aluminum (Al) as α-alumina. The content of Al is 98.0% by mass or more, preferably 98.5% by mass or more, and still more preferably 99.0% by mass or more as expressed in terms of an oxide ($Al_2O_3$) in 100% by mass of the precursor. By controlling the content of Al to the aforementioned range, a sintered compact keeping the appropriate hardness is obtained. When the content of Al is decreased, the purity of alumina in the alumina sintered compact is lowered. In general, it is known that when the purity of alumina in the alumina sintered compact is lowered, the hardness of the sintered compact is lowered. Although an upper limit of the content of Al may be regulated in relation with the additive components, such as yttrium, and is not particularly limited, for example, it may be set to 99.97% by mass. In the mass of the precursor, a binder resin, such as polyvinyl alcohol, which is used during molding the precursor, and a solvent, such as water, are not included.

The precursor of the present embodiment contains yttrium (Y). The content of Y is 0.01 to 1.35 parts by mass as expressed in terms of an oxide ($Y_2O_3$) based on 100 parts by mass of the content of aluminum as expressed in terms of $Al_2O_3$. When the content of Y is 0.01 parts by mass or more, the mechanical characteristic in the sintered compact are improved owing to the addition effect of Y. In addition, when the content of Y is 1.35 parts by mass or less, the relative density of the sintered compact is improved. In addition, from the viewpoint of obtaining a sintered compact that is more minute and excellent in mechanical characteristics, the content of Y is preferably 0.03 to 1.10 parts by mass, and more preferably 0.05 to 1.00 part by mass. The precursor of the present embodiment preferably contains the yttrium as at least one of yttrium acetate tetrahydrate and yttrium oxide, and in particular, it more preferably contains the yttrium as yttrium acetate tetrahydrate.

The precursor of the present invention contains at least one metal selected from the group consisting of iron (Fe), zinc (Zn), cobalt (Co), manganese (Mn), copper (Cu), niobium (Nb), antimony (Sb), tungsten (W), silver (Ag), and gallium (Ga) (hereinafter sometimes generically referred to as "co-additive component, such as Fe"). Above all, it is preferred to contain at least one selected from the group consisting of Fe, Zn, Co, Mn, Cu, Nb, Ag, and Ga as the co-additive component, such as Fe. In addition, from the viewpoint of improving the relative density of the sintered compact, at least one metal selected from the group consisting of Fe, Zn, Co, Mn, Cu, Ag, and Ga is preferably contained, at least one metal selected from the group consisting of Fe, Zn, and Cu is more preferably contained, and Fe is still more preferably contained. Although the co-additive component, such as Fe, may be used alone or may be used in admixture of two or more thereof, it is more preferred that the co-additive component, such as Fe, is used alone.

The total content of the metals selected from Fe, Zn, Co, Mn, Cu, Nb, Sb, W, Ag, and Ga is 0.02 to 1.55 parts by mass as expressed in terms of oxides ($Fe_2O_3$, ZnO, $Co_2O_3$, $Mn_2O_3$, CuO, $Nb_2O_5$, $Sb_2O_3$, $WO_3$, $Ag_2O$, and $Ga_2O_3$) based on 100 parts by mass of the content of aluminum as expressed in terms of $Al_2O_3$. In particular, so long as the total content of the co-additive components, such as Fe, is 0.02 parts by mass or more, even when Y is contained, a readily sinterable precursor is provided. For that reason, according to such a precursor, it is not needed to increase the heat treatment temperature, and a sintered compact that is minute and excellent in mechanical characteristics is obtained. In addition, so long as the total content of the co-additive components, such as Fe, is 1.55 parts by mass or less, the purity of alumina in the sintered compact can be kept high. Furthermore, the total content of the co-additive components, such as Fe, is preferably 0.03 to 1.20 parts by mass, and more preferably 0.05 to 1.00 parts by mass, from the viewpoint of obtaining a sintered compact that is more minute and excellent in mechanical characteristics. In the case where the co-additive component, such as Fe, is a component of a single kind, the total content of the co-additive components, such as Fe, is the content of the foregoing component of a single kind. In addition, it is preferred that the precursor includes the co-additive component, such as Fe, as an oxide of each of the metals.

The precursor of the present embodiment may further contain other component than those as mentioned above within a range where the effects of the present invention are not hindered. Specifically, the following components are exemplified.

The precursor of the present embodiment may contain silicon (Si). The content of Si is preferably 0 to 0.12 parts by mass as expressed in terms of an oxide ($SiO_2$) based on 100 parts by mass of the content of aluminum as expressed in terms of $Al_2O_3$. By controlling the content of Si to 0.12 parts by mass or less as expressed in terms of $SiO_2$, a minute sintered compact is obtained. Although it is preferred that the precursor does not substantially contain Si, in the case where the purity of a material to be used for the raw material is relatively low, taking into consideration Si to be inevitably incorporated, the content of Si may be 0.001 parts by mass or more based on 100 parts by mass of the content of aluminium as expressed in terms of $Al_2O_3$, and it is more preferably 0.07 parts by mass or less, still more preferably 0.05 parts by mass or less, and yet still more preferably 0.03 parts by mass or less.

It is preferred that the precursor of the present embodiment further contains sodium (Na). According to this, the sinterability can be more improved. The content of Na is preferably 0.05 to 1.0 part by mass, more preferably 0.08 to 0.70 parts by mass, and still more preferably 0.10 to 0.70 parts by mass as expressed in terms of an oxide ($Na_2O$) based on 100 parts by mass of the content of aluminum as expressed in terms of $Al_2O_3$. When the content of Na falls within the aforementioned range, a more minute sintered compact is obtained.

The precursor of the present embodiment may further contain other component than those as mentioned above within a range where the effects of the present invention are not hindered. Examples of the other component include magnesium (Mg), calcium (Ca), potassium (K), and titanium (Ti). The content of each other component is preferably 0.20 parts by mass or less, more preferably 0.10 parts by mass or less, still more preferably 0.05 parts by mass or less, and yet still more preferably 0.03 parts by mass or less as expressed in terms of an oxide of each component based on 100 parts by mass of the content of aluminum as expressed in terms of $Al_2O_3$. In addition, the total content of the other components is preferably 0.20 parts by mass or less, and more preferably 0.10 parts by mass or less in terms of the total content of the respective components as expressed in terms of an oxide of each component based on 100 parts by mass of the content of aluminum as expressed in terms of $Al_2O_3$.

<Production Method of Precursor of Alumina Sintered Compact>

One example of a suitable production method of the precursor of an alumina sintered compact of the present embodiment is hereunder described.

Although the production method of the precursor according to the present embodiment is not particularly limited, it includes Step (1): a step of mixing raw materials, and it may further include Step (2): a step of molding a raw material mixture obtained in the Step (1).

Step (1): Step of Mixing Raw Materials

As the raw materials, known materials can be broadly used so long as they serve as supply sources of respective components to be contained in the precursor. Examples of such a material include compounds containing at least one of metals which are contained in the precursor. These materials can be used in combination of two or more thereof, as the need arises.

Specifically, examples of a material serving as a supply source of Al include compounds containing Al, such as an oxide, a hydroxide, a nitride, a fluoride, or a chloride of Al. These compounds may also be a hydrate. In addition, these materials may be used in combination of two or more thereof. Above all, an alumina raw material powder containing, as a main component, aluminum oxide ($Al_2O_3$, alumina) is more preferably used. Furthermore, the aluminum oxide is preferably α-alumina. Here, the α-alumina indicates aluminum oxide having an α-crystallization rate of 90% or more. The α-crystallization rate of such an aluminum oxide as α-alumina is preferably 90% or more, more preferably 95% or more, and still more preferably 98% or more. The aforementioned α-crystallization rate is defined as a value as measured under an evaluation condition described in the section of the present Examples.

The alumina raw material powder is preferably one having a high purity, and for example, alumina purified by the Bayer method can be used. The alumina amount in the alumina raw material powder is preferably 90% by mass or more, more preferably 95% by mass or more, still more preferably 99% by mass or more, and yet still more preferably 99.5% by mass or more. In such an alumina raw material powder, examples of other component than the alumina as the main component include $Fe_2O_3$, $SiO_2$, $Na_2O$, CaO, MgO, $TiO_2$, and $K_2O$. In consequence, in the case of using an alumina raw material powder having a low purity, such an alumina raw material powder may also inevitably become a supply source of other component than Al as mentioned later.

Examples of the material serving as a supply source of Y include compounds containing Y, such as an oxide, a hydroxide, a halide, a nitride, a carbonate, an acetate, a nitrate, or a sulfate of Y. These compounds may also be a hydrate. In addition, these materials may be used in combination of two or more thereof. Above all, yttrium acetate tetrahydrate and yttrium oxide are suitable. In particular, yttrium acetate is more preferred from the standpoint that it is soluble in water, so that it can be added to the raw material mixture when dissolved in water and can be uniformly dispersed in the precursor. In addition, yttrium acetate is preferred from the standpoint that it is inexpensive.

Examples of the material serving as a supply source of at least one metal selected from the group consisting of Fe, Zn, Co, Mn, Cu, Nb, Sb, W, Ag, and Ga include compounds containing at least one metal selected from the aforementioned group. Examples of such a compound include oxides, hydroxides, halides, nitrides, carbonates, acetates, nitrates, and sulfates of one metal selected from the aforementioned group, or a composite metal containing one or more thereof. These compounds may also be a hydrate. In addition, these compounds may be used in combination of two or more thereof. Above all, a compound containing one metal selected from the aforementioned group is suitable, and in particular, an oxide of the foregoing metal is more suitable.

Examples of the material serving as a supply source of Si include silicon oxide and a compound containing Si, such as various silicates. These compounds may be used in combination of two or more thereof. Above all, the aforementioned silicon oxide is suitable. Examples of the silicon oxide include fumed silica, silicic acid, and water glass.

Examples of the material serving as a supply source of Na include compounds containing Na, such as an oxide, a hydroxide, a halide, a nitride, a carbonate, an acetate, a nitrate, or a sulfate of Na. These compounds may also be a hydrate. In addition, these compounds may be used in combination of two or more thereof. Above all, sodium hydroxide or sodium bicarbonate is suitable, and sodium hydroxide is more suitable.

A single material may also serve as a supply source of two or more components. Examples of such a material include a composite metal oxide containing two or more metals, such as $Y_3Al_5O_{12}$ and $Y_3Fe_5O_{12}$; and materials having a low purity, such as the aforementioned alumina raw material powder. In the case where the single material serves as a supply source of two or more components, its blending amount may be regulated such that the content of each of the components is regulated as a whole of the precursor.

For that reason, from the viewpoint of easiness of regulation of the blending amount and control of the sinterability, the step of mixing the raw materials is a step of mixing the aluminum oxide, the compound containing yttrium, and the at least one compound containing one metal selected from the group consisting of iron, zinc, cobalt, manganese, copper, niobium, antimony, tungsten, silver, and gallium. By providing such a step, the supply source of Al, the supply source of Y, and the supply source of the co-additive component, such as Fe, can be blended such that they are separated as individual compounds, respectively, and therefore, regulation of the composition and control of the sinterability become easy.

Examples of a mode of these raw materials include a powder, a metal powder, a slurry, and an aqueous solution, and the mode can be appropriately selected according to goodness of workability or dispersibility. For example, in the case of using a powdery raw material, from the viewpoint of obtaining a homogenous mixed powder, cumulative volume 50% diameters ($d_{50}$) of various raw materials are each preferably 3 μm or less, and more preferably 1 μm or less. Here, the cumulative volume 50% diameters ($d_{50}$) of various powder can be measured by the laser diffraction method.

In the step of mixing the raw materials, it is preferred that a predetermined amount of each of the raw materials is weighed in advance according to the blending proportion of each material. Here, the weighing can be performed by a known method, and the blending proportion of each material may be appropriately regulated in conformity with the composition of the precursor.

A mixing method is not particularly limited and can be performed adopting a known mixing system. For example, mixing can be performed by a system, such as a container rotation type, a mechanical stirring type, a fluid stirring type, a non-stirring type, and a high-speed and impact type. Specifically, a kneader, a blender, or the like is suitably used.

On mixing the raw materials, water or a medium, such as formic acid, methanol, ethanol, 1-propanol, 2-propanol, 1-butanol, acetic acid, dimethyl sulfoxide, N,N-dimethylformamide, acetonitrile, acetone, and tetrahydrofuran may be used, as the need arises. In this case, the raw material mixture is dried after the mixing treatment, and after drying, the resultant may be subjected to a crushing treatment, as the need arises. A particle diameter of the thus obtained raw material mixture is preferably 3 μm or less, and more preferably 1 μm or less in terms of a cumulative mass 50% diameter ($d_{50}$). The cumulative mass 50% diameter ($d_{50}$) of the raw material mixture can be measured by the laser diffraction method.

The thus obtained raw material mixture is the precursor of an alumina sintered compact of the present invention.

Step (2): Step of Molding the Raw Material Mixture Obtained in the Step (1)

A step of molding the raw material mixture obtained in the Step (1) may be further included, as the need arises.

In the present step, the raw material mixture obtained by mixing the aforementioned raw materials is molded in an arbitrary shape, to obtain an alumina molded body.

Although the shape of the alumina molded body is not particularly limited, examples thereof include a columnar shape having a size of 0.5 to 5 mm in diameter and 1 to 10 mm in length, a pyramid shape, a star shape, a triangular shape, and an amorphous shape.

Examples of a molding method of molding the raw material mixture include mold pressing, cold isostatic pressing, casting molding, injection molding, extrusion molding, and sheet molding. To the raw material mixture, a water-soluble binder, such as polyvinyl alcohol (PVA) and methyl cellulose, may be added, as the need arises.

The thus obtained alumina molded body is also one mode of the precursor of an alumina sintered compact of the present invention.

<Production Method of Alumina Sintered Compact>

Next, one example of a suitable production method of the alumina sintered compact using the precursor of the present embodiment is described.

The production method of the alumina sintered compact of the present embodiment preferably includes Step (I): a step of obtaining a precursor of an alumina sintered compact; and Step (II): a step of firing the precursor of an alumina sintered compact obtained in the Step (I).

Step (I): Step of Obtaining a Precursor of an Alumina Sintered Compact

The present step (I) is one as in the aforementioned production method of a precursor. That is, one example thereof includes Step (1): a step of mixing raw materials, and it may further include Step (2): a step of molding a raw material mixture obtained in the Step (1).

Step (II): Step of Firing the Precursor of an Alumina Sintered Compact Obtained in the Step (I), to Obtain an Alumina Sintered Compact.

The present Step (II) is a step of sintering the precursor through firing (heat treatment). The firing can be performed by a known method, and for example, a hot pressing method, a normal-pressure firing method, a gas pressure firing method, a microwave heating firing method, and the like can be adopted.

Although a firing temperature can be, for example, set to 1,300 to 1,700° C., the precursor according to the present embodiment is readily sintered as compared with a conventional raw material mixture containing yttrium, and therefore, even when the firing temperature is, for example, set to 1,575° C. or lower, and further 1,550° C. or lower, a sintered body that is minute and excellent in mechanical strength is obtained. In particular, from the viewpoint of obtaining a minute sintered compact while suppressing the crystal grain growth, the firing temperature is preferably 1,300 to 1,575° C., more preferably 1,300 to 1,550° C., still more preferably 1,400 to 1,550° C., and yet still more preferably 1,450 to 1,550° C.

A firing time may be appropriately regulated according to the firing temperature or the like, and it is, for example, 15 minutes to 4 hours, preferably 15 minutes to 3 hours, and more preferably 15 minutes to 2 hours.

A firing atmosphere may be appropriately regulated according to the need, and for example, an oxidative atmosphere, such as an air atmosphere, can be adopted.

The precursor before firing is preferably molded in advance. A molding method is the same as in the Step (2) of the production method of a precursor as mentioned above.

The alumina sintered compact obtained by the production method of the present embodiment is minute and excellent in mechanical strength. A relative density of such an alumina sintered compact is preferably 95% or more, more preferably 97% or more, and still more preferably 98% or more. In addition, a crystal grain diameter is preferably 0.5 to 2.5 μm, and more preferably 0.7 to 2.0 μm. In addition, a Vickers hardness is preferably 18.5 GPa or more, and more preferably 19.0 GPa or more. A fracture toughness value is preferably 3.0 MPa·m$^{1/2}$ or more, and more preferably 3.5 MPa·m$^{1/2}$ or more. All of the relative density, the crystal grain diameter, the Vickers hardness, and the fracture toughness value are values as measured under evaluation conditions described in the section of the present Examples.

Such an alumina sintered compact has a high hardness and excellent fracture toughness, and it is suitable as, for example, tools for the grinding, cutting, polishing, etc. of materials to be ground, materials to be cut, material to be polished, and the like, and furthermore, abrasive grains for heavy grinding grindstone in the steel industry.

<Alumina Sintered Compact>

The alumina sintered compact of the present embodiment includes aluminum, yttrium, and at least one metal selected from the group consisting of iron, zinc, cobalt, manganese, copper, niobium, antimony, tungsten, silver, and gallium, wherein the content of the aluminum is 98.0% by mass or more as expressed in terms of an oxide ($Al_2O_3$) in 100% by mass of the alumina sintered compact;

the content of the yttrium is 0.01 to 1.35 parts by mass as expressed in terms of an oxide ($Y_2O_3$) based on 100 parts by mass of the content of the aluminum as expressed in terms of an oxide;

the total content of the metals selected from the foregoing group is 0.02 to 1.55 parts by mass as expressed in terms of an oxide based on 100 parts by mass of the content of aluminum as expressed in terms of an oxide; and a relative density thereof is 95% or more.

The alumina sintered compact of the present embodiment is preferably one obtained by the production method of an alumina sintered compact of the present embodiment as mentioned above. According to the foregoing production method, even at a lower firing temperature (for example, 1,300 to 1,575° C.) than that in the conventional method, the high relative density can be efficiently realized, and the production costs can be greatly reduced.

A preferred mode of the alumina sintered compact of the present embodiment is the same as that obtained by the production method of an alumina sintered compact of the present embodiment as mentioned above.

<Abrasive Grains>

The abrasive grains of the present embodiment are preferably constituted of an alumina sintered compact obtained by the production method of an alumina sintered compact of the present embodiment.

That is, one example of a suitable production method of the abrasive grains of the present embodiment is achieved by the production method of an alumina sintered compact of the present embodiment.

<Grindstone>

The grindstone of the present embodiment includes a base metal and a layer of the abrasive grains of the present embodiment, which are provided on the operation surface of the base metal.

Examples of a fixing method of the abrasive grains onto the operation surface in the grindstone of the present embodiment include resin bonding, vitrified bonding, metal bonding, and electrodeposition.

Examples of a material of the base metal include steel, a stainless steel alloy, and an aluminum alloy.

The resin bonding is favorable in sharpness, but it is low in durability. The vitrified bonding is favorable in sharpness and abrasion resistance, but it causes an internal stress in the abrasive grains and makes the abrasive grains likely to be cracked or chipped. The electrodeposition is large in a degree of freedom in terms of a shape and also favorable in sharpness.

In view of the foregoing, in the grindstone, the fixing method of abrasive grains is selected according to the application thereof.

Specifically, for example, in the case of a resin-bonded grindstone, the grindstone of the present invention is obtained by fixing the abrasive grain layer onto the operation surface of the base metal through a method (i) of mixing a powder of a binder, such as a phenol resin and a polyimide resin, and abrasive grains, or coating the binder on the abrasive grains, and then filling in a mold, followed by press molding; or a method (ii) of mixing a liquid binder, such as an epoxy resin and an unsaturated polyester resin, and abrasive grains, and injecting the mixture into a mold and curing.

The shape of the grindstone of the present invention is not particularly limited, and it may be appropriately selected from a shape, such as a straight shape and a cup shape, according to an application of the grindstone.

While the present embodiments of the present invention have been described, it should be construed that the present invention is by no means limited to the aforementioned embodiments, and any modes which are included in the scope of the concept and claims of the present invention are included and can be modified in various ways within the scope of the present invention.

EXAMPLES

The present invention is hereunder described in detail by reference to Examples, but it should be construed that the present invention is by no means limited thereto.

Example 1

1,000 g of an alumina raw material powder (content of aluminum oxide ($Al_2O_3$): 99.75% by mass, α-crystallization rate of aluminum oxide: 99% or more, $d_{50}$: 0.62 μm) was mixed with 2.5 g of iron oxide (available from Kanto Chemical Co., Inc., $d_{50}$: 0.52 μm) and 3.4 g of granular polyvinyl alcohol (available from Kuraray Co., Ltd., Model No.: PVA-205) for 10 minutes by using a bench kneader ("PNV-5", available from Irie Shokai Co., Ltd.). Thereafter, an yttrium(III) acetate tetrahydrate aqueous solution having 2.5 g of yttrium(III) acetate tetrahydrate (available from Kanto Chemical Co., Inc.) dissolved in 300 g of distilled water was prepared, and the aqueous solution was then added in the aforementioned mixture and kneaded for 30 minutes, thereby preparing a precursor of an alumina sintered compact. Table 1 shows a blending composition based on the aforementioned charge composition.

With respect to the aforementioned alumina raw material powder, the composition was confirmed in advance by the fluorescent X-ray elemental analysis method. As a measuring apparatus of the fluorescent X-ray elemental analysis, a scanning fluorescent X-ray analyzer "ZSX Primus", available from Rigaku Corporation was used. A measuring sample was prepared by the powder pressing method using press molded pellets and quantitatively analyzed by the fundamental parameter method (FP method).

With respect to the composition of the precursor of an alumina sintered compact, similarly to the case of the alumina raw material powder, the quantitative analysis was performed by the FP method with the aforementioned scanning fluorescent X-ray analyzer, thereby confirming that it coincided with the charge composition.

The $d_{50}$ of each of the alumina raw material powder and the iron oxide was measured with a Microtrack particle size distribution meter ("Microtrack (registered trademark) HRA", available from Nikkiso Co., Ltd.).

The α-crystallization rate of the aluminum oxide in the alumina raw material powder was calculated according to the following formula (1) from diffraction spectra obtained by using a powder X-ray diffraction apparatus (model name: "X'pert PRO", available from Panalytical) under a condition of characteristic X-ray: CuKα ray, tube voltage: 40 kV, and tube current: 40 mA and from a peak height ($I_{68.1}$) at 2θ=68.1° derived from an alumina α-phase (300) and a peak height ($I_{67.2}$) at 2θ=67.2° derived from δ-phase, θ-phase, X-phase, Y-phase, θ-phase, and ε-phase.

$$\alpha\text{-Crystallization rate} = I_{68.1}/(I_{68.1}+I_{67.2}) \times 100 (\%) \quad (1)$$

Comparative Example 1

In Comparative Example 1, only an alumina raw material powder in which the iron oxide and the yttrium(III) acetate tetrahydrate aqueous solution were not added was used as the precursor of an alumina sintered compact.

Comparative Example 2

In Comparative Example 2, a precursor of an alumina sintered compact was obtained in the same method as in Example 1, except that the iron oxide was not added.

Comparative Example 3

In Comparative Example 3, a precursor of an alumina sintered compact was obtained in the same method as in Example 1, except that the yttrium(III) acetate tetrahydrate aqueous solution was not added.

Comparative Example 4

In Comparative Example 4, a precursor of an alumina sintered compact was obtained in the same method as in Example 1, except that the blending amount of the iron oxide was changed so as to provide a blending composition as shown in Table 1.

[Evaluation I]

Using the precursor of an alumina sintered compact according to each of Example 1 and Comparative Examples 1 to 4, an alumina sintered compact was prepared by the following method, and the alumina sintered compact was tested (evaluated) as follows.

[1] Preparation of Alumina Sintered Compact

The precursor of an alumina sintered compact was molded by using an extrusion molding machine, to prepare an alumina molded body. Thereafter, this molded body was sintered by holding in an electric furnace (air atmosphere) for 1 hour at a firing temperature shown in Table 1, thereby obtaining an alumina sintered compact (in a columnar shape having a size of 1.6 mm in diameter and 3.5 mm in length).

[2] Relative Density

The relative density was determined by dividing an apparent density measured by the hydrostatic weighing method of JIS Z8807:2012 by a true density. On this occasion, on the assumption that all of the compounds added and the like existed in the state of an oxide, the calculation was made such that the true densities are 3.95 for alumina, 5.01 for yttrium oxide, 5.24 for iron oxide, 2.20 for silicon oxide, 2.27 for sodium oxide, 3.65 for magnesium oxide, 3.34 for calcium oxide, 5.61 for zinc oxide, 6.11 for cobalt oxide, 5.03 for manganese oxide, 6.31 for copper oxide, 4.47 for niobium oxide, 5.20 for antimony oxide, 7.16 for tungsten oxide, 7.14 for silver oxide, and 6.44 for gallium oxide, respectively.

[3] Crystal Grain Diameter

The resulting alumina sintered compact was cut, and the cut surface was mirror-finished and thermally etched at a temperature lower by 100° C. than the firing temperature for 5 minutes. The sample was observed with a scanning electron microscope (modal name: "JSM-6510V", available from JEOL Ltd.), and cross-sectional photographs with a magnification of 5,000 times were taken at arbitrary five points. Each of the cross-sectional photographs was subjected to image analysis with an image analysis software (a software name: "Mac-View ver.4", available from Mountech Co., Ltd.); 500 crystal grains as arbitrarily selected from the five cross-sectional photographs were measured for a crystal grain diameter in terms of a diameter of a sphere having the same volume as each crystal grain; the obtained measured values (N=500) were averaged; and an average value thereof was defined as the crystal grain diameter.

[4] Vickers Hardness

A model name: "MVK-VL Hardness Tester", available from Akashi Corporation (presently Mitutoyo Corporation) was used as an apparatus. The measurement was performed under a condition at a load of 0.98 N for an indenter application time of 10 seconds, and 15 alumina sintered compacts which were arbitrarily selected for every sample were analyzed in the same manner. Furthermore, the obtained measured values (N=15) were averaged, and an average value thereof was defined as the Vickers hardness.

[5] Fracture Toughness Value

The fracture toughness value was determined by the IF method (indentation fracture method) on the basis of JIS R1607:2015, "Testing Methods for Fracture Toughness of Fine Ceramics at Room Temperature". A model name: "DVK-1", available from Matsuzawa Seiki Co., Ltd. (presently Matsuzawa Co., Ltd.) was used as an apparatus. The measurement was performed under a condition at a maximum load of 49 N and an indenter application speed of 50 μm/sec for an indenter application time of 15 seconds, and 10 alumina sintered compacts which were arbitrarily selected for every sample were analyzed in the same manner. Furthermore, the obtained measured values (N=10) were averaged, and an average value thereof was defined as the fracture toughness value. The calculation formula is as follows.

$$K_{IC}=0.026 \times E^{1/2} \times P^{1/2} \times a/c^{3/2}$$

$K_{IC}$: Fracture toughness value (MPa·m$^{1/2}$)
E: Young's modulus (Pa)
P: Maximum load (N)
a: Indentation size (m)
c: Crack size (m)

In the present invention, a value of alumina ($3.9 \times 10^{11}$ Pa) was used for the Young's modulus E.

[6] Grinding Ratio

In general, the grinding ratio is determined by performing a frictional abrasion test regarding a grindstone resulting from hardening of abrasive grains made of an alumina sintered compact with a resin and calculating an abrasion amount of the grindstone, followed by calculation according to the following formula (A).

Grinding ratio={Ground amount of material to be ground (grinding amount)}/(Abrasion amount of grindstone)  (A)

However, in the present Examples, the frictional abrasion test was performed by using the alumina sintered compact in place of the grindstone, the abrasion amount of the alumina sintered compact was calculated, and the grinding ratio was calculated using the abrasion amount of the alumina sintered compact in terms of an abrasion amount of the grindstone in the aforementioned formula (A). The ground amount of material to be ground in the above-mentioned formula (A) and the abrasion amount of the alumina sintered compact were obtained by the following methods.

First of all, the frictional abrasion test of the alumina sintered compact was performed by using a pin-on-disk type frictional abrasion tester.

The fractional abrasion test was performed by pressing the prepared alumina sintered compact (in a columnar shape having a size of 1.6 mm in diameter and 3.5 mm in length) on a rotating disk-shaped material to be ground and grinding the material to be ground at a peripheral speed of 10 m/min and a pressing load of 50 N for a grinding time of 3 minutes. As the material to be ground, S45C that is a carbon steel prescribed in JIS G4051:2016 (steel material of carbon steel for a machine structure), which had a size of 160 mm in diameter and 10 mm in thickness, and in which an arithmetic average roughness Ra of the friction surface coming into contact with the test body was 3.2, was used without thermal refining, such as quenching.

Next, with respect to the material to be ground after the test, the abrasion weight was calculated. The abrasion weight of the material to be ground (disk body) was calculated from a cross-sectional area of an abrasion mark and a diameter of an abrasion site, and also a density of the material to be ground according to the following formula (i).

Abrasion amount of material to be ground=$\pi \rho r A$  (i)

In the formula (i), $\rho$ is a density of the material to be ground (g/cm$^3$); r is a diameter of the abrasion site of test body (mm); and A is a cross-sectional area of the abrasion mark (mm$^2$).

The cross-sectional area of the abrasion mark and the diameter of the abrasion site were measured with a digital microscope (Model: VHX-6000, available from Keyence Corporation). In addition, the diameter of the abrasion site was measured in terms of a diameter of a circle passing through the width center of the abrasion mark. The density of the grinding material was measured by the hydrostatic weighing method as prescribed in JIS Z8807:2012 in terms of an apparent specific gravity of the material to be ground.

Furthermore, with respect to the alumina sintered compact after the test, an abrasion volume (mm$^3$) was calculated, and the abrasion volume was converted into a weight from the density of the alumina sintered compact to obtain an abrasion amount of the alumina sintered compact. The abrasion volume of the alumina sintered compact was calculated from the abrasion length before and after the test and the diameter of the alumina sintered compact according to the following formula (ii).

Abrasion volume of alumina sintered compact= (Abrasion length)×{(Diameter of alumina sintered compact)/2}$^2 \pi$  (ii)

The abrasion length means a difference in the length of the alumina sintered compact before the test and after the test. The length (mm) and diameter (mm) of the alumina sintered compact were measured with a digital microscope (as above).

The density of the alumina sintered compact was measured by the hydrostatic weighing method as prescribed in JIS Z8807:2012 in terms of an apparent specific gravity of the alumina sintered compact.

The grinding ratio was calculated according to the aforementioned formula (A) while expressing the calculated abrasion weight of the material to be ground in terms of the "ground amount of material to be ground" and the abrasion weight of the alumina sintered compact in terms of the "abrasion amount of grindstone", respectively. With respect to three alumina sintered compacts which were arbitrarily selected for every sample, the measurement was performed in the same manner. Furthermore, the measured values (N=3) obtained for every sample were averaged, and an average value thereof was defined as the grinding ratio of each sample.

The measurement of the grinding ratio was performed only with respect to the sintered compacts of Example 1, Comparative Example 3, and Comparative Example 4.

TABLE 1

| | Precursor [parts by mass] | | | | | | | $Al_2O_3$/ precursor | Firing temperature | Relative density | Crystal grain diameter | Vickers hardness | Fracture toughness value | Grinding ratio |
|---|---|---|---|---|---|---|---|---|---|---|---|---|---|---|
| | $Al_2O_3$ | $Y_2O_3$ | $Fe_2O_3$ | $SiO_2$ | $Na_2O$ | MgO | CaO | [mass %] | [° C.] | [%] | [μm] | [GPa] | [MPa · $m^{1/2}$] | ratio |
| Example 1 | 100.00 | 0.09 | 0.26 | 0.02 | 0.09 | 0.05 | 0.03 | 99.5 | 1550 | 98.1 | 1.7 | 19.5 | 3.8 | 95.5 |
| Comparative Example 1 | 100.00 | 0.00 | 0.01 | 0.02 | 0.09 | 0.05 | 0.03 | 99.8 | 1550 | 97.5 | 2.3 | 18.4 | 3.2 | — |
| Comparative Example 2 | 100.00 | 0.09 | 0.01 | 0.02 | 0.09 | 0.05 | 0.03 | 99.7 | 1550 | 96.2 | | | — | |
| | | | | | | | | | 1580 | 98.2 | 1.9 | 19.4 | 3.9 | — |
| Comparative Example 3 | 100.00 | 0.00 | 0.26 | 0.02 | 0.09 | 0.05 | 0.03 | 99.5 | 1550 | 97.0 | 2.5 | 18.7 | 3.3 | 49.1 |
| Comparative Example 4 | 100.00 | 0.09 | 2.04 | 0.02 | 0.09 | 0.05 | 0.03 | 97.7 | 1550 | 99.1 | 3.6 | 18.1 | 3.0 | 25.4 |

(Note)
The bold underlines in the table indicate those falling outside the aptitude range of the present invention.

As shown in Table 1, in Example 1, in view of the fact that in particular, the precursor contained yttrium and iron in predetermined amounts, it was confirmed that the alumina sintered compact that is minute and excellent in mechanical strength was obtained. In view of the fact that such an alumina sintered compact of Example 1 is high in terms of the grinding ratio as measured by the method in the present Examples, it may be expected that even in the case of actually using it as a grindstone, a high grinding ratio can be realized.

In contrast, in Comparative Example 1, since the precursor did not contain yttrium and iron, it was confirmed that in particular, the mechanical strength was low as compared with Example 1.

On the other hand, in Comparative Example 2 in which the precursor contained only yttrium, it was confirmed that the sintering was hindered by the addition of yttrium, and at the same firing temperature, the relative density of the resulting sintered compact was remarkably lowered as compared with the precursor of Comparative Example 1 not containing yttrium.

In the case of such a precursor of Comparative Example 2, it was confirmed that in order to obtain a minute alumina sintered compact, the firing temperature is needed to be increased.

In addition, Comparative Example 3 is concerned with the precursor having only iron added thereto without including yttrium, and favorable sinterability at a lower temperature and improvement in mechanical strength of the resulting alumina sintered compact as in the precursor of Example 1 containing predetermined amounts of yttrium and iron were not confirmed. In addition, in view of the fact that the alumina sintered compact of Comparative Example 3 was significantly inferior in the grinding ratio as measured by the method in the present Examples to the alumina sintered compact of the Example 1, it may be expected that even when used as a grindstone, a sufficient grinding ratio is not obtained.

In addition, in the case of containing both yttrium and iron as in the precursor of Comparative Example 4, it was confirmed that the content of aluminum in the precursor is lower than 98% by mass as expressed in terms of aluminum oxide; and that when the content of iron is more than 1.55 parts by mass as expressed in terms of iron oxide based on 100 parts by mass of the content of aluminum oxide, in the resulting alumina sintered compact, in particular, the Vickers hardness was lowered, and sufficient mechanical strength was not obtained. In addition, in view of the fact that such an alumina sintered compact of Comparative Example 4 is significantly inferior in the grinding ratio as measured by the method in the present Examples to the alumina sintered compact of the Example 1, it may be expected that even when used as a grindstone, a sufficient grinding ratio is not obtained.

Examples 2 to 9 and Comparative Example 5

In each of Examples 2 to 9 and Comparative Example 5, a precursor of an alumina sintered compact was obtained in the same method as in Example 1, except that the blending amount of the yttrium(III) acetate tetrahydrate was changed so as to provide a blending composition as shown in Table 2.

Examples 10 to 19

In each of Examples 10 to 19, a precursor of an alumina sintered compact was obtained in the same method as in Example 1, except that the blending amount of the iron oxide was changed so as to provide a blending composition as shown in Table 2.

Examples 20 to 22

In each of Examples 20 to 22, 1,000 g of an alumina raw material powder was blended with 1.25 g of iron oxide and fumed silica (available from Nippon Aerosil Co., Ltd.) in a predetermined amount as weighed so as to provide a blending composition as shown in Table 2, to which was then further added 3.4 g of granular polyvinyl alcohol, and the contents were mixed with a bench kneader for 10 minutes. Thereafter, an yttrium(III) acetate tetrahydrate aqueous solution having 2.5 g of yttrium(III) acetate tetrahydrate dissolved in 300 g of distilled water was prepared, the aqueous solution was added to the aforementioned mixture, and the contents were kneaded for 30 minutes, thereby obtaining a precursor of an alumina sintered compact.

Examples 23 to 25

In each of Examples 23 to 25, 1,000 g of an alumina raw material powder was blended with 2.5 g of iron oxide and sodium hydroxide (available from Kanto Chemical Co., Inc.) in a predetermined amount as weighed so as to provide a blending composition as shown in Table 2, to which was then further added 3.4 g of granular polyvinyl alcohol, and the contents were mixed with a bench kneader for 10 minutes. Thereafter, an yttrium(III) acetate tetrahydrate aqueous solution having 2.5 g of yttrium(III) acetate tetrahydrate dissolved in 300 g of distilled water was prepared, the aqueous solution was added to the aforementioned mixture, and the contents were kneaded for 30 minutes, thereby obtaining a precursor of an alumina sintered compact.

[Evaluation II]

Using the precursor of an alumina sintered compact according to each of Examples 2 to 25 and Comparative Example 5, an alumina sintered compact was prepared and determined for the relative density by the method as described in the aforementioned Evaluation I.

In this evaluation, the firing was performed at 1,550° C. for 1 hour, and at this time, an allowance level of the relative density was defined as 97.0% or more. The results are shown in Table 2.

In Table 2, Example 1 is the same data as in Example 1 described in Table 1. Furthermore, Comparative Example 2 is the same as the data at the time when the firing temperature is 1,550° C. in Comparative Example 2 described in Table 1.

TABLE 2

| | Precursor [parts by mass] | | | | | | | $Al_2O_3$/ precursor [mass %] | Firing at 1,550° C. Relative density [%] |
|---|---|---|---|---|---|---|---|---|---|
| | $Al_2O_3$ | $Y_2O_3$ | $Fe_2O_3$ | $SiO_2$ | $Na_2O$ | MgO | CaO | | |
| Comparative Example 2 | 100.00 | 0.09 | 0.01 | 0.02 | 0.09 | 0.05 | 0.03 | 99.7 | 96.2 |
| Example 1 | 100.00 | 0.09 | 0.26 | 0.02 | 0.09 | 0.05 | 0.03 | 99.5 | 98.1 |
| Example 2 | 100.00 | 0.01 | 0.26 | 0.02 | 0.09 | 0.05 | 0.03 | 99.5 | 98.4 |
| Example 3 | 100.00 | 0.03 | 0.26 | 0.02 | 0.09 | 0.05 | 0.03 | 99.5 | 98.5 |
| Example 4 | 100.00 | 0.05 | 0.26 | 0.02 | 0.09 | 0.05 | 0.03 | 99.5 | 98.4 |
| Example 5 | 100.00 | 0.17 | 0.26 | 0.02 | 0.09 | 0.05 | 0.03 | 99.4 | 98.0 |
| Example 6 | 100.00 | 0.34 | 0.26 | 0.02 | 0.09 | 0.05 | 0.03 | 99.2 | 97.3 |
| Example 7 | 100.00 | 0.51 | 0.26 | 0.02 | 0.09 | 0.05 | 0.03 | 99.0 | 97.2 |
| Example 8 | 100.00 | 1.02 | 0.26 | 0.02 | 0.09 | 0.05 | 0.03 | 98.5 | 97.2 |
| Example 9 | 100.00 | 1.31 | 0.26 | 0.02 | 0.09 | 0.05 | 0.03 | 98.3 | 97.1 |
| Comparative Example 5 | 100.00 | 1.51 | 0.26 | 0.02 | 0.09 | 0.05 | 0.03 | 98.1 | 96.8 |
| Example 10 | 100.00 | 0.09 | 0.02 | 0.02 | 0.09 | 0.05 | 0.03 | 99.7 | 98.4 |
| Example 11 | 100.00 | 0.09 | 0.03 | 0.02 | 0.09 | 0.05 | 0.03 | 99.7 | 98.6 |
| Example 12 | 100.00 | 0.09 | 0.04 | 0.02 | 0.09 | 0.05 | 0.03 | 99.7 | 98.1 |
| Example 13 | 100.00 | 0.09 | 0.05 | 0.02 | 0.09 | 0.05 | 0.03 | 99.7 | 98.2 |
| Example 14 | 100.00 | 0.09 | 0.09 | 0.02 | 0.09 | 0.05 | 0.03 | 99.6 | 98.8 |
| Example 15 | 100.00 | 0.09 | 0.11 | 0.02 | 0.09 | 0.05 | 0.03 | 99.6 | 98.0 |
| Example 16 | 100.00 | 0.09 | 0.14 | 0.02 | 0.09 | 0.05 | 0.03 | 99.6 | 97.9 |
| Example 17 | 100.00 | 0.09 | 0.77 | 0.02 | 0.09 | 0.05 | 0.03 | 99.0 | 98.6 |
| Example 18 | 100.00 | 0.09 | 1.02 | 0.02 | 0.09 | 0.05 | 0.03 | 98.7 | 98.2 |
| Example 19 | 100.00 | 0.09 | 1.51 | 0.02 | 0.09 | 0.05 | 0.03 | 98.2 | 98.1 |
| Example 20 | 100.00 | 0.09 | 0.14 | 0.05 | 0.09 | 0.05 | 0.03 | 99.6 | 97.6 |
| Example 21 | 100.00 | 0.09 | 0.14 | 0.07 | 0.09 | 0.05 | 0.03 | 99.5 | 97.5 |
| Example 22 | 100.00 | 0.09 | 0.14 | 0.12 | 0.09 | 0.05 | 0.03 | 99.5 | 97.1 |
| Example 23 | 100.00 | 0.09 | 0.26 | 0.02 | 0.19 | 0.05 | 0.03 | 99.4 | 98.6 |
| Example 24 | 100.00 | 0.09 | 0.26 | 0.02 | 0.31 | 0.05 | 0.03 | 99.2 | 98.4 |
| Example 25 | 100.00 | 0.09 | 0.26 | 0.02 | 0.72 | 0.05 | 0.03 | 98.8 | 97.4 |

As shown in Table 2, in the case where the contents of yttrium and iron contained in the precursor of the alumina sintered compact are controlled within the predetermined ranges, the co-additive effect owing to yttrium and iron is obtained. As a result, a minute alumina sintered compact is obtained without increasing the heat treatment temperature (Examples 1 to 25). On the other hand, even in the case of jointly adding yttrium and iron, when the amount of yttrium is in excess, the sintering is hindered, and it becomes difficult to obtain a minute alumina sintered compact (Comparative Example 5).

Examples 26 to 34

In each of Examples 26 to 34, a precursor of an alumina sintered compact was obtained in the same method as in Example 16, except that a compound containing a predetermined metal as mentioned below was blended in a predetermined amount in place of the iron oxide so as to provide a blending proportion as expressed in terms of a metal oxide as shown in Table 3.

As for the compound containing a predetermined metal, there were used zinc oxide (available from Kanto Chemical Co., Inc.) in Example 26; cobalt oxide (available from Kanto Chemical Co., Inc.) in Example 27; manganese oxide (available from Kanto Chemical Co., Inc.) in Example 28; copper oxide (available from Kanto Chemical Co., Inc.) in Example 29; niobium oxide (available from Kanto Chemical Co., Inc.) in Example 30, antimony oxide (available from Kanto Chemical Co., Inc.) in Example 31; tungsten oxide (available from Kanto Chemical Co., Inc.) in Example 32; silver oxide (available from Kanto Chemical Co., Inc.) in Example 33; and gallium oxide (available from Kanto Chemical Co., Inc.) in Example 34, respectively.

[Evaluation III]

Using the precursor of an alumina sintered compact according to each of Examples 26 to 34, an alumina sintered compact was prepared and determined for the relative density by the method as described in the aforementioned Evaluation I.

In this evaluation, the firing was performed at 1,550° C. for 1 hour, and at this time, an allowance level of the relative density was defined as 97.0% or more. The results are shown in Table 3.

Example 16 described in Table 3 is the same data as in Example 16 described in Table 2.

TABLE 3

| | Precursor [parts by mass] | | | | | | | | $Al_2O_3$/ precursor [mass %] | Firing at 1,550° C. Relative density [%] |
|---|---|---|---|---|---|---|---|---|---|---|
| | $Al_2O_3$ | $Y_2O_3$ | $Fe_2O_3$ | Oxide other than Fe | $SiO_2$ | $Na_2O$ | MgO | CaO | | |
| Example 16 | 100.00 | 0.09 | 0.14 | — | 0.02 | 0.09 | 0.05 | 0.03 | 99.6 | 98.0 |
| Example 26 | 100.00 | 0.09 | 0.01 | ZnO: 0.13 | 0.02 | 0.09 | 0.05 | 0.03 | 99.7 | 98.5 |
| Example 27 | 100.00 | 0.09 | 0.01 | $CO_2O_3$: 0.13 | 0.02 | 0.09 | 0.05 | 0.03 | 99.7 | 98.2 |
| Example 28 | 100.00 | 0.09 | 0.01 | $Mn_2O_3$: 0.13 | 0.02 | 0.09 | 0.05 | 0.03 | 99.7 | 98.7 |
| Example 29 | 100.00 | 0.09 | 0.01 | CuO: 0.13 | 0.02 | 0.09 | 0.05 | 0.03 | 99.7 | 99.2 |
| Example 30 | 100.00 | 0.09 | 0.01 | $Nb_2O_5$: 0.13 | 0.02 | 0.09 | 0.05 | 0.03 | 99.7 | 97.5 |
| Example 31 | 100.00 | 0.09 | 0.01 | $Sb_2O_3$: 0.13 | 0.02 | 0.09 | 0.05 | 0.03 | 99.7 | 97.2 |
| Example 32 | 100.00 | 0.09 | 0.01 | $WO_3$: 0.13 | 0.02 | 0.09 | 0.05 | 0.03 | 99.7 | 97.9 |
| Example 33 | 100.00 | 0.09 | 0.01 | $Ag_2O$: 0.13 | 0.02 | 0.09 | 0.05 | 0.03 | 99.7 | 98.2 |
| Example 34 | 100.00 | 0.09 | 0.01 | $Ga_2O_3$: 0.13 | 0.02 | 0.09 | 0.05 | 0.03 | 99.7 | 98.7 |

As shown in Table 3, it was confirmed that even in the case of using one metal selected from the group consisting of zinc, cobalt, manganese, copper, niobium, antimony, tungsten, silver, and gallium in place of the iron together with yttrium, a minute sintered compact was obtained at a low temperature (Examples 26 to 34).

The invention claimed is:

1. A precursor of an alumina sintered compact comprising aluminum, yttrium, silicon, and at least one metal selected from the group consisting of iron, zinc, cobalt, manganese, copper, niobium, antimony, tungsten, silver, and gallium, wherein the content of the aluminum is 98.0% by mass or more as expressed in terms of an oxide ($Al_2O_3$) in 100% by mass of the precursor of an alumina sintered compact;

the content of the yttrium is 0.01 to 1.35 parts by mass as expressed in terms of an oxide ($Y_2O_3$) based on 100 parts by mass of the content of the aluminum as expressed in terms of an oxide;

the total content of the metals selected from the foregoing group is 0.02 to 1.55 parts by mass as expressed in terms of an oxide based on 100 parts by mass of the content of aluminum as expressed in terms of an oxide;

the aluminum is contained as α-alumina; and the content of the silicon is 0.001 to 0.12 parts by mass as expressed in terms of an oxide ($SiO_2$) based on 100 parts by mass of the content of the aluminum as expressed in terms of the oxide ($Al_2O_3$).

2. The precursor of an alumina sintered compact according to claim 1, wherein the yttrium is contained as yttrium acetate tetrahydrate.

3. The precursor of an alumina sintered compact according to claim 1, which is used for obtaining an alumina sintered compact constituting abrasive grains.

4. A method for producing an alumina sintered compact, comprising:

a step (I) of obtaining the precursor of an alumina sintered compact according to claim 1; and a step (II) of firing the precursor of an alumina sintered compact, to obtain an alumina sintered compact.

5. The method for producing an alumina sintered compact according to claim 4, wherein the step (I) of obtaining the precursor of an alumina sintered compact includes a step of mixing α-alumina, a compound containing yttrium, and a compound containing at least one metal selected from the group consisting of iron, zinc, cobalt, manganese, copper, niobium, antimony, tungsten, silver, and gallium.

6. The method for producing an alumina sintered compact according to claim 4, wherein the compound containing yttrium is yttrium acetate tetrahydrate.

7. The method for producing an alumina sintered compact according to claim 4, wherein a firing temperature of the precursor of an alumina sintered compact is 1,300 to 1,575° C.

8. The method for producing an alumina sintered compact according to claim 4, wherein a relative density of the alumina sintered compact is 95.0% or more.

9. An alumina sintered compact comprising aluminum, yttrium, silicon, and at least one metal selected from the group consisting of iron, zinc, cobalt, manganese, copper, niobium, antimony, tungsten, silver, and gallium, wherein the content of the aluminum is 98.0% by mass or more as expressed in terms of an oxide ($Al_2O_3$) in 100% by mass of the alumina sintered compact;

the content of the yttrium is 0.01 to 1.35 parts by mass as expressed in terms of an oxide ($Y_2O_3$) based on 100 parts by mass of the content of the aluminum as expressed in terms of an oxide;

the total content of the metals selected from the foregoing group is 0.02 to 1.55 parts by mass as expressed in terms of an oxide based on 100 parts by mass of the content of aluminum as expressed in terms of an oxide;

a relative density of the alumina sintered compact is 95.0% or more; and the content of the silicon is 0.001 to 0.12 parts by mass as expressed in terms of an oxide ($SiO_2$) based on 100 parts by mass of the content of the aluminum as expressed in terms of an oxide ($Al_2O_3$).

\* \* \* \* \*